UNITED STATES PATENT OFFICE.

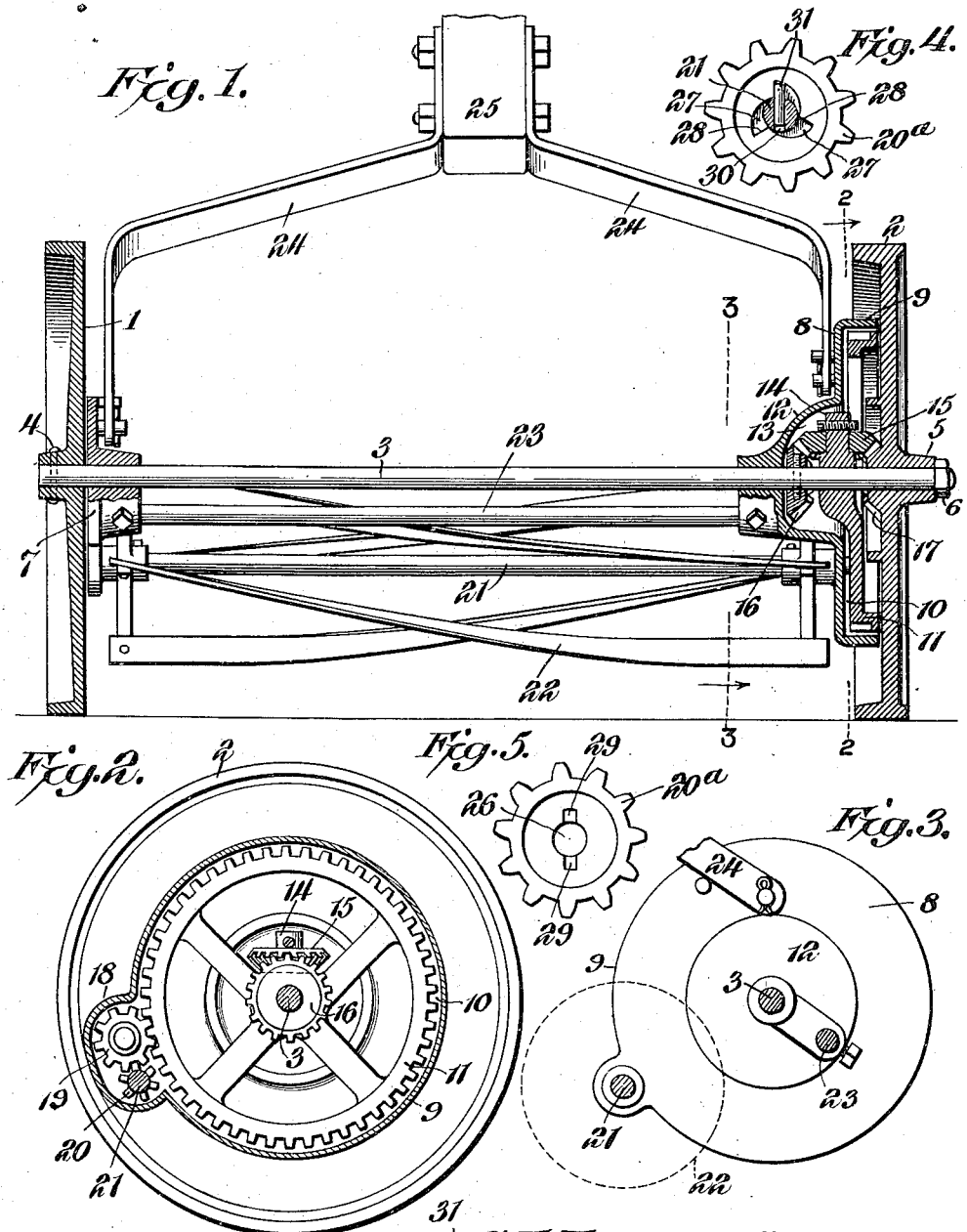

CHARLES E. TOWNSEND, OF BILLINGS, MONTANA.

LAWN-MOWER.

1,195,418.  Specification of Letters Patent.  Patented Aug. 22, 1916.

Application filed September 22, 1915.  Serial No. 52,027.

*To all whom it may concern:*

Be it known that I, CHARLES E. TOWNSEND, a citizen of the United States, residing at Billings, in the county of Yellowstone and State of Montana, have invented a new and useful Lawn-Mower, of which the following is a specification.

This invention has reference to lawn mowers and its object is to provide a gearing for lawn mowers permitting a cutting down of the cost of manufacture and avoiding sudden jerking or failure of the gearing to drive the cutters, especially where the drive wheels may drop into rough places in the ground or in cases where sharp turns are made.

In accordance with the present invention the drive wheels are connected together and to the master gear wheel by differential gearing, while the master gear is connected to the cutter shaft in any suitable manner as by speed multiplying gearing.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified so long as such changes and modifications come within the scope of the appended claims.

In the drawings:—Figure 1 is a vertical section through the driving parts of a lawn mower equipped with the present invention, and omitting some parts of the lawn mower structure. Fig. 2 is a vertical section of the driving gearing as viewed from the left hand side thereof in Fig. 1 and with the gear casing in section on the line 2—2 of Fig. 1. Fig. 3 is a section on the line 3—3 of Fig. 1 omitting the cutters and the drive wheel at the right hand side of Fig. 1. Figs. 4 and 5 are views of opposite faces of a clutch pinion on the wiper shaft. Fig. 6 is a view partly in section of one end of the wiper shaft receiving the pinion of Figs. 4 and 5.

Referring to the drawings there are shown two drive wheels 1 and 2, respectively, mounted on the opposite ends of an axle 3. In the particular showing of the drawings the drive wheel 1 is made fast to the axle 3 as by a pin 4 extending through the hub of the wheel 1, while the axle extends through the hub 5 of the wheel 2 and the wheel is held on the axle by a nut 6 or otherwise, so that the wheel may turn freely on the axle, or the axle may turn freely in the wheel. Also mounted on the axle 3 near the wheel 1 is a side plate 7, and mounted on the axle 3 near the wheel 2 is another side plate 8 provided with an overhang 9 concentric with the axle and in conjunction with the wheel 2 forming a chamber 10 for the reception of a master gear wheel 11. The side plate 8 therefore constitutes a gear cover for the gear wheel 11, and is provided near the axle 3 with an extension 12 inclosing a chamber 13 housing certain gearing to be described, so that the extension 12 also forms a gear cover. The gear wheel 11 is provided with a stud 14 extending radially from its hub portion, and mounted on this stud is a bevel pinion 15 meshing on one side with a bevel pinion 16 fast to the shaft 3 and on the other side with a bevel pinion 17 on the hub portion of the drive wheel 2, the pinion 17 in the showing of the drawings being integral with the wheel 2.

The pinions 15, 16 and 17 constitute a differential gear connection between the axle 3 and the drive wheel 2, and since the drive wheel 1 is fast on the axle, the gear wheels 15, 16 and 17 constitute a differential gear connection between the two drive wheels.

The side plate or gear casing 8 has a side extension 18 carrying meshed pinions 19, 20, one of which is in mesh with the gear wheel 11 and the other of which is mounted on a shaft 21 journaled at the ends in suitable bearings in the side plates 7 and 8 and carrying a rotary cutter or wiper 22. The side plates are connected together and braced by a girth rod 23 and connected to the side plates are handle braces 24 carrying a handle 25.

In the drawings certain parts which are common to lawn mowers have been omitted, because in themselves they have nothing to do with the invention. Among the omitted parts common to lawn mowers may be mentioned the stationary knife and supports therefor.

When the lawn mower is moving straight ahead both wheels engage the ground and both wheels act simultaneously as driving wheels, so that the pinions 16 and 17 rotate together in the same direction at the same speed. The pinion 15 is thereby locked between the two pinions 16 and 17 and must therefore rotate orbitally with the pinions 16 and 17 about the axis of the shaft 3 without revolving about the stud 14. Since the pinion 15 is carried by the stud 14 and the latter is fast on the gear wheel 11, said gear wheel is rotated in the same direction and at the same speed as the drive wheels 1 and 2, and the wiper 22 is rotated at full speed agreeable with the progressive travel of the lawn mower. Suppose, however, that the lawn mower is being pushed around a corner or in some other curved path, or for some reason one or the other of the drive wheels fails to grip the ground, and, therefore, is no longer driven, but may be considered as standing still, or as rotating at a slower speed than the other drive wheel. Under such circumstances one pinion, say the pinion 16, may be considered as standing still or rotating very slowly in a progressive direction, while the other pinion 17 is rotated at full speed in a forward direction. The pinion 17 will then tend to rotate the pinion 15, causing it to move about the axis of the pinion 16, thus imparting rotative movement to the gear wheel 11 and the wiper 22 is driven forwardly as before.

In any case there is no slip and no sudden gripping of clutches. The wiper receives positive motion, wherefore the propelling of the lawn mower is rendered easier for the operator. The number of parts necessary for the transmission of power from either or both drive wheels to the wiper is reduced and the cost of manufacture is correspondingly reduced. The lawn mower operates as easily upon rough ground as upon smooth ground, because there is no sudden slackening of the wiper motion when one of the drive wheels drops into a rough place. When the lawn mower is used on relatively short curves, power is furnished by both drive wheels at the same time. Since there are no sudden jerks in the mowing operation the life of the machine is prolonged. As both drive wheels are furnishing power at the same time, whether on a straight course or on curves, the amount of labor needed in the mowing operation is lessened.

For the purpose of permitting the machine to be drawn backwardly without actuating the wiper, the pinion 20 may be constructed as shown in Figs. 4 and 5. These two figures show a pinion 20$^a$ somewhat larger than the showing of the pinion 20 in Fig. 2 and the pinion 20$^a$ has a through central passage 26 with a circular series of cam recesses 27 in one face producing shoulders 28 radial to the central opening 26. The other face of the pinion 20$^a$ has diametrically opposite radial recesses 29 leading from the passage 26.

The shaft 21 is provided at the end carrying the pinion 20$^a$ with a diametric passage 30 in which is lodged a pin 31 adapted to enter any one of the recesses 28 or both recesses 29. The pin 31 and recesses 28 coact to provide a one-way clutch for actuating the wiper forwardly only. When it is desired to sharpen the blades of the wiper and the usual stationary knife, (not shown), the pinion 20$^a$ is reversed, whereupon the pin 31 entering the recesses 29 lock the wiper to the shaft 21 for reverse rotation. Then by the application of emery or other abrasive to the knives the latter are sharpened.

What is claimed is:—

1. A lawn mower comprising two drive wheels, an axle upon which the drive wheels are mounted, one drive wheel being rigidly secured to the axle and the other drive wheel being connected to the axle by differential gearing with one member of the differential gearing rigidly fast to the second-named drive wheel, a casing carried by the axle in inclosing relation to the differential gearing, a side plate carried by the axle adjacent to the first-named drive wheel and traversed by the axle, a cutter journaled in the casing and in the side plate, driving connections between the cutter and the differential gearing, a girth rod connecting the side plate and casing, and a handle connected to the side plate and casing.

2. A lawn mower comprising two drive wheels, an axle to which one drive wheel is fixed with the other drive wheel loosely mounted on the axle and having a pinion formed on its hub, a gear wheel mounted on the axle adjacent to the second-named drive wheel and carrying a pinion meshing with the first-named pinion, another pinion on the axle on the side of the gear wheel remote from the second-named drive wheel and meshing with the second-named pinion, a casing mounted on the axle and inclosing the gear wheel and pinions, a side plate mounted on the axle adjacent to the first-named gear wheel, a girth rod connecting the side plate and casing, a cutter journaled in the side plate and casing, respectively, and gearing connections between the gear wheel and cutter and inclosed in the casing.

3. A lawn mower comprising two drive wheels, an axle to which one drive wheel is fixed with the other drive wheel loosely mounted on the axle and having a pinion formed on its hub, a gear wheel mounted on the axle adjacent to the second-named drive wheel and carrying a pinion meshing with the first-named pinion, another pinion on the axle on the side of the gear wheel remote from the second-named drive wheel and meshing with the second-named pinion, a casing mounted on the axle and inclosing the gear wheel and pinions, a side plate mounted on the axle adjacent to the first-named gear wheel, a girth rod connecting the side plate and casing, a cutter journaled in the side plate and casing, respectively, and gearing connections between the gear wheel and cutter and inclosed in the casing, said gearing connections including a one-way clutch structure.

In testimony, that I claim the foregoing as my own, I have hereto affixed my signature in the presence of two witnesses.

CHARLES E. TOWNSEND.

Witnesses:
F. B. REYNOLDS,
G. C. DERRY.

Copies of this patent may be obtained for five cents each, by addressing the "Commissioner of Patents, Washington, D. C."